United States Patent [19]

Everman

[11] 4,030,867

[45] June 21, 1977

[54] APPARATUS FOR FORMING A BAR OF SOAP FROM LEFTOVER PIECES

[75] Inventor: Don D. Everman, California, Md.

[73] Assignee: Lawrence Peska Associates, Inc., New York, N.Y.

[22] Filed: July 19, 1976

[21] Appl. No.: 706,140

[52] U.S. Cl. .......................... 425/144; 222/146 HE; 425/148; 425/256; 425/160

[51] Int. Cl.[2] ........................ B29C 5/00; B29B 5/06; C11D 13/16

[58] Field of Search .......... 425/148, 160, 256, 144; 222/58, 146 H, 146 HE

[56] References Cited

UNITED STATES PATENTS

| | | | |
|---|---|---|---|
| 3,083,880 | 4/1963 | Weisz | 222/146 H |
| 3,266,096 | 8/1966 | Thomas et al. | 425/148 X |
| 3,876,105 | 4/1975 | Kelling | 222/146 HE X |

*Primary Examiner*—Robert D. Baldwin

[57] ABSTRACT

An apparatus for forming a bar of soap from leftover pieces includes a hopper for holding pieces until enough are collected to form a new bar. Then a weight sensor causes the activation of a heater which melts the collected soap. The molten soap runs into a mold, thus producing a new bar.

6 Claims, 5 Drawing Figures

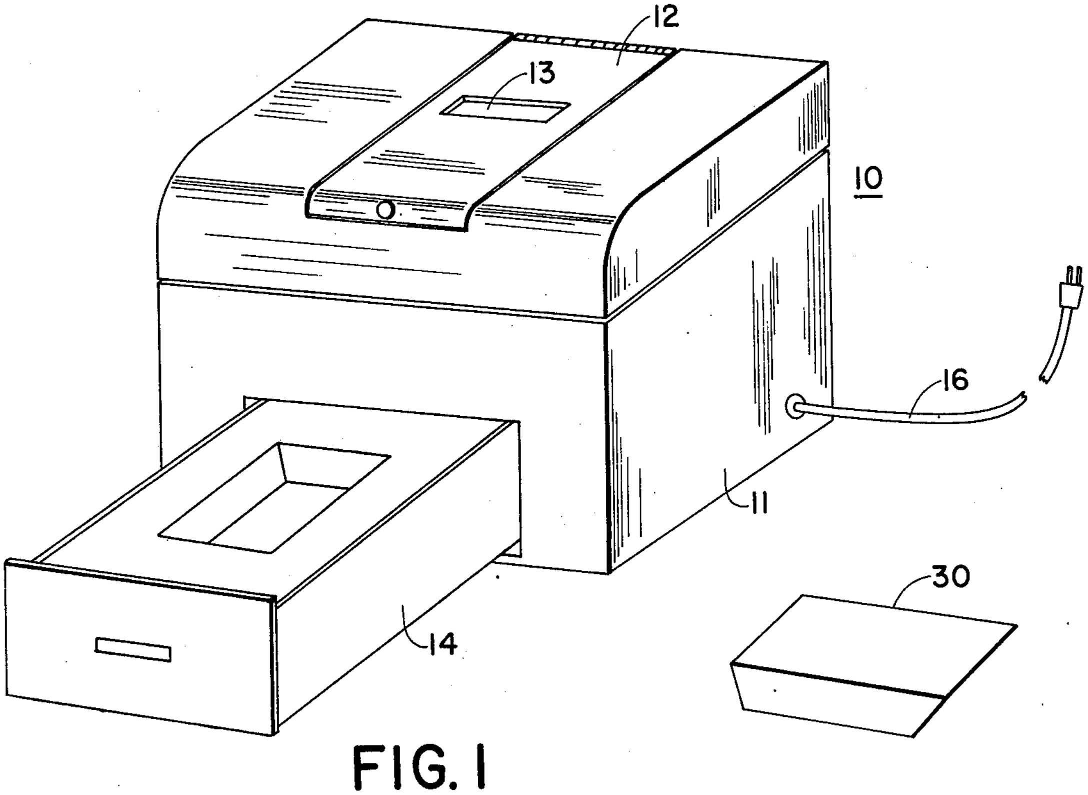
FIG. 1
FIG. 4
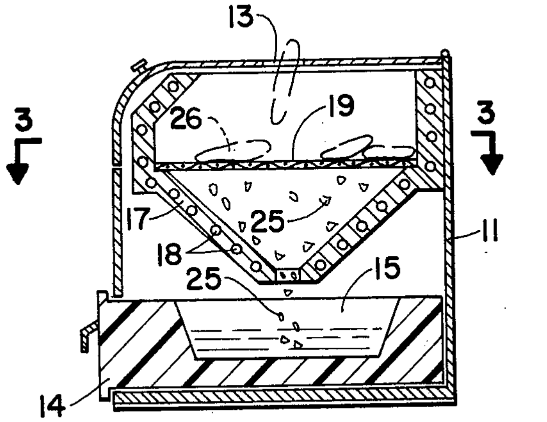
FIG. 2
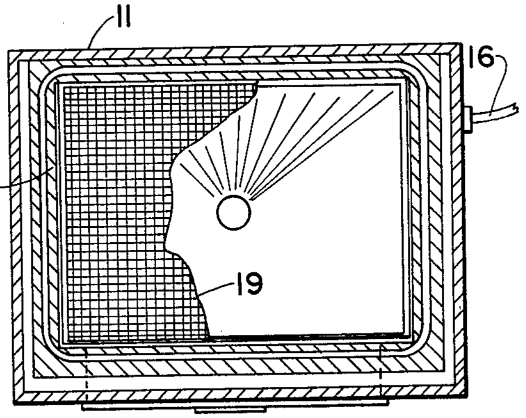
FIG. 3
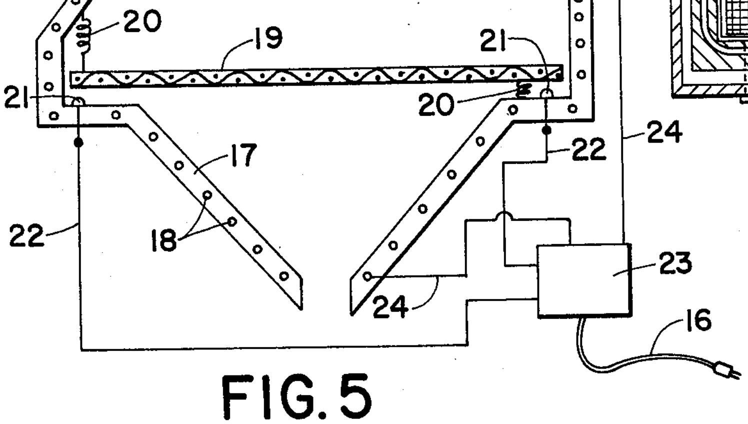
FIG. 5

APPARATUS FOR FORMING A BAR OF SOAP FROM LEFTOVER PIECES

BACKGROUND OF THE INVENTION

The invention is in the field of soap bar fabrication. More particularly it concerns the fabrication of soap bars from pieces of soap. The prior art includes apparatus for fabricating soap bars by pressing soap pieces. Most prior art apparatus is of industrial type and not particularly suited for home use (see, for example, U.S. Pat. No. 3,094,758, issued June 25, 1963 and U.S. Pat. No. 3,746,647, issued July 17, 1973). Although one home-type soap press is marketed by Stratford House, P.O. Box 591, Stratford, Connecticut 06497.

SUMMARY OF THE INVENTION

A convenient, household appliance type apparatus has been invented, for the production of a new bar of soap from leftover soap slivers and pieces, by melting the soap pieces and collecting the molten soap in a mold. Leftover pieces are placed in a hopper until enough soap is collected to form a new bar. A weight sensor detects the presence of sufficient soap and activates a heater, which melts the soap to produce a new bar. As each new bar is removed, a quantity of candle scent can be placed in the mold, to give the next bar the desired fragrance.

BRIEF DESCRIPTION OF THE DRAWINGS

FIG. 1 is a perspective view of an exemplary apparatus of the invention;

FIG. 2 is an elevational view, in section, of the apparatus of FIG. 1;

FIG. 3 is a plan view, in section, of the apparatus of FIG. 1;

FIG. 4 is a perspective view of a soap bar produced by an apparatus of the invention; and FIG. 5 is an elevational view, in section, of an exemplary hopper, showing an exemplary weight sensing means with the electrical circuitry shown schematically.

DETAILED DESCRIPTION

The soap saving apparatus 10, illustrated in FIG. 1 is a household appliance for converting leftover soap slivers and pieces into usable soap bars. The outer casing 11 has a hinged door 12 in its upper surface. The door 12 is provided with a slot 13 for insertion of the pieces of soap. A slideably mounted draw 14 with a depression 15 serves as a mold for the renewed soap bar 30 (FIG. 4). This could be a heavy walled plastic draw. An electrical cord 16 provides power to the device 10 for the melting and molding of the soap pieces.

FIG. 2 shows pieces of soap 26 being fed into the slot 13 and coming to rest on the apertured partition 19, which may, for example, be screening material or slotted expanded sheet metal. The soap 26 is collected on the partition 19 until enough is collected to form a new bar of soap 30. The walls of the hopper 17 are insulating and define a chute at the bottom to direct molten soap 25 into the mold 15 formed in the sliding draw 14. The bottom surface of the mold 15 may have a pattern of ridges or grooves to form the complementary pattern (e.g., the word "SAVED") in the soap bar 30.

The device 10 also contains a heating element to melt the soap pieces 26. These are exemplified in FIG. 2 as heating coils 18 embedded in the walls of the hopper 17. The heating coils are activated by a controller 23 (see FIG. 5) when enough soap has been deposited in the hopper to form a new bar. A weight sensing device is employed to indicate this status to the controller by means of a triggering signal. In FIG. 5 this weight sensing device includes springs 20 which close an electrical circuit 22 when the desired weight of soap 26 deflects the springs 20 to cause the shorting of the contacts 21 through the partition 19. The controller 23 then causes electrical energy from the appliance cord 16 to flow through the leads 24 to the heater 18. When the soap 26 has been melted and the new bar 30 formed. The heater 18 is turned off, for example, by a timer included in the controller 23.

What is claimed is:

1. Apparatus for molding soap bars from leftover pieces of soap, comprising an outer casing with a hinged and slotted door in the upper surface thereof;

an open topped hopper fixed within the casing under the slotted door, said hopper including insulating walls defining a chute at the bottom thereof;

an apertured partition, extending laterally within the hopper so as to retain the pieces of soap within the hopper when they are introduced through the slotted door;

a mold slideably positioned within the casing, below the chute and adapted for being withdrawn through an aperture in the casing;

heating means, so situated within the hopper as to melt the pieces of soap resting on the partition;

control means for activating and deactivating the heating means; and weight sensing means for sensing the weight of the pieces of soap and providing a triggering signal to the control means when the weight of the accumulated pieces of soap is equal to the weight of a complete bar, whereby the pieces of soap are then melted, the molten soap flowing through the apertured partition, down the chute and into the mold to form a new bar whereupon the heater is deactivated.

2. Apparatus of claim 1 in which the heating means comprises heating coils embedded within the walls of the hopper.

3. Apparatus of claim 1 in which the apertured partition consists principally of a rigid screen.

4. Apparatus of claim 1 in which the slideably positioned mold consists essentially of a heavy walled plastic draw.

5. Apparatus of claim 1 in which the weight sensing means includes at least one spring supporting the partition away from the hopper, and at least one pair of electrical contacts so situated as to close an electrical circuit when the spring is deflected by the desired weight of soap.

6. Apparatus of claim 1 in which the control means includes a timer to deactivate the heating means.

* * * * *